United States Patent [19]
Buczynski

[11] 3,762,091
[45] Oct. 2, 1973

[54] LURE SAVER
[76] Inventor: John A. Buczynski, 71 Fir St., Mahtomedi, Minn. 55115
[22] Filed: June 9, 1972
[21] Appl. No.: 261,521

[52] U.S. Cl. ................................................. 43/17.2
[51] Int. Cl. ............................................ A01k 97/00
[58] Field of Search ...................................... 43/17.2

[56] References Cited
UNITED STATES PATENTS
1,215,073 2/1917 Stevens ................................. 43/17.2
2,516,036 7/1950 Whitlow et al. ..................... 43/17.2
3,568,353 3/1971 Kilgore ................................. 43/17.2

FOREIGN PATENTS OR APPLICATIONS
617,392 2/1949 Great Britain ....................... 43/17.2

*Primary Examiner*—Russell R. Kinsey
*Assistant Examiner*—Daniel J. Leach
*Attorney*—Robert M. Dunning

[57] ABSTRACT

A weighted lure retrieving device having a line guide adapted to slide down a fishing line and a pair of hooks which pivot about the line guide when the lower portion of the device is pulled by means of an auxiliary cord so as to engage a trapped lure at the end of the fishing line.

4 Claims, 4 Drawing Figures

PATENTED OCT 2 1973 3,762,091
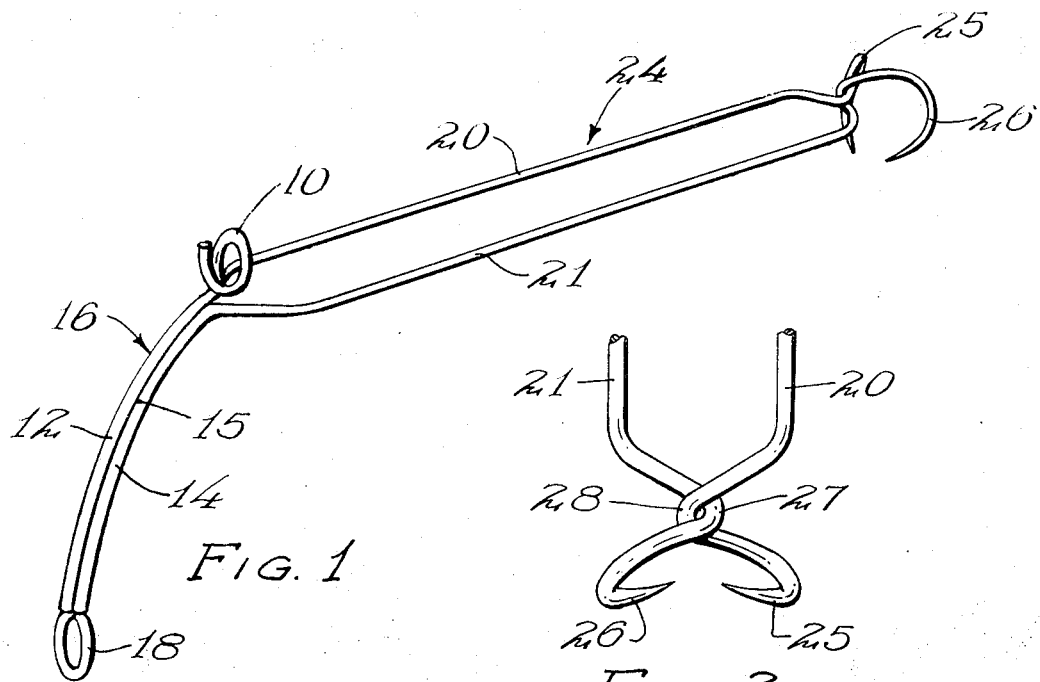
FIG. 1
FIG. 2
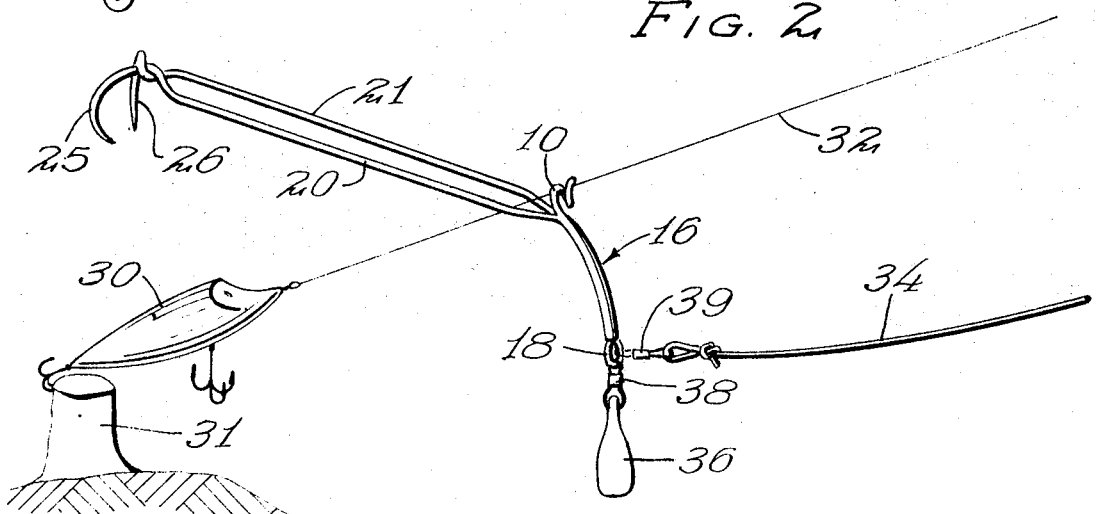
FIG. 4
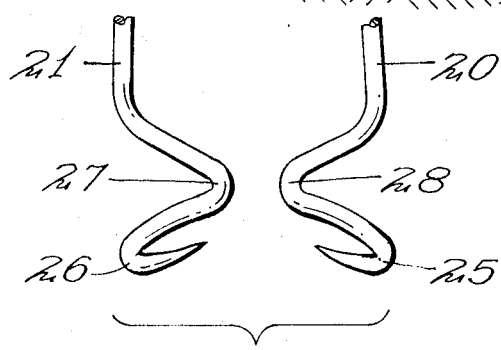
FIG. 3

LURE SAVER

BACKGROUND OF THE INVENTION

It is well known that the sport of fishing is plagued with the problem of trapped lures which often snag on something on or near the bottom of a lake or river. Pulling on the fishing line itself in an attempt to break the lure free can be a fruitless endeavor since the fishing line may easily break resulting in a lost lure. It is thus desirable to have some sort of auxiliary device connected by means of a much stronger cord which can travel down the fish line, engage the lure, and forcibly remove it without breaking the fishing line. Prior art devices for accomplishing this end have been less than satisfactory.

One prior art approach has involved a device intended to jar the lure loose with repeated impacts. Such a system is ineffective. Firstly, the extremely sharp hooks on the fish lures tend to snag very solidly and are relatively unaffected by impacts or jars. Secondly, the water medium itself prevents the lure from being jarred to any significant degree since quick movements are resisted. Another prior art approach involves sliding a weight down the fishing line which weight is designed to slide over the lure and engage the hook or the leader. These devices are also quite unsuccessful since they require that they be sized very accurately in accordance with the particular lure being retrieved. Thus, for efficient operation a multitude of different retriever devices are necessary to match the different lures. The most desirable approach is to provide an apparatus which actually takes hold of the lure itself and provides a strong pull. The device should further be adaptable to engage a wide variety of lures. My invention accomplishes these ends as indicated below.

SUMMARY OF THE INVENTION

Briefly, my invention contemplates a lure retriever in which two interlocking hooks extend out in one direction from a line guide while a weight and connecting auxiliary cord extend out in an opposite direction from the line guide. The line guide is threaded over the fishing line. The interlocking hooks are slipped apart, the fishing line inserted, and the hooks are closed above the line. The shape of the device is such that the weighted portion hangs downward holding the two interlocking hooks in a position above the line so that as the device slides down the fishing line the hooks will come into position directly above the trapped lure. By pulling on the weighted end with the auxiliary cord the hooks are pivoted down directly into engagement with the lure so as to positively engage the lure, its hooks, or the snag itself and permit the lure's removal. It may therefore be seen that it is an object of my invention to provide an improved lure saver which will operate to engage the lure itself and be suitable to retrieve a wide variety of different types of lures. Further objects and advantages will become apparent upon consideration of the following description and drawings.

BRIEF DESCRIPTION OF THE DRAWINGS

FIG. 1 is a perspective view showing the general configuration of the lure saver of my invention.

FIGS. 2 and 3 are enlarged detailed views of the hook portion of my retriever showing respectively the interlocking position and the open position.

FIG. 4 shows how my invention is employed to engage and dislodge a trapped lure.

DESCRIPTION OF THE PREFERRED EMBODIMENT

In FIG. 1 it may be seen that my lure saver comprises a line guide 10 which is formed from the end of a piece of wire rod 12 which is substantially one-eighth inch in diameter. Tempered piano wire or spring steel wire which is twisted as shown has been found suitable to provide the line guide. A second piece of wire 14 is utilized to form the remainder of the shank 16, the eyelet 18, the saddle 24, and the hooks 25 and 26. The piece of wire 14 begins at one of the hooks, say, for example, hook 26 and is bent as shown to form hook 26 and saddle portion 21. Wire 14 is formed into an eyelet 18 and bent to form a shank portion which is welded along the opposite side of wire 12. The remainder of the wire forms the other side 20 of the saddle 24 and hook 25. Bead welds 15 between wire 14 and wire 12 insure a strong shank 16 which will retain the shape shown.

FIG. 2 is an enlarged detail showing of the interlocking hook portions. In FIG. 2 it may be seen that the two sides 20 and 21 of the saddle portion are notched in and out again at 27 and 28 before forming hooks 25 and 26. These notches 27 and 28 are interlocked as shown so as to close saddle 24. The interlock may be formed by a simple 180° twist of the wires about each other. To utilize my lure retriever sides 20 and 21 are squeezed inwardly so as to separate the two hook portions as shown in FIG. 3. The fishing line leading to the snagged lure is then inserted into the saddle and slipped around and into line guide 10 with a quick flick of the wrist. Hooks 25 and 26 are then again interlocked by engaging notches 27 and 28. The spring loaded interlocking hooks are a substantial improvement over prior art devices in which parts of the device are bent about the fish line. In these devices continued bending soon weakens the connecting portions and they break.

In FIG. 4 it may be seen that the lure saver is provided with a suitable sinker or lead weight 36 which is connected to eyelet 18 by means of a conventional connecting snap 38. A heavy weight cord 34 having the ability to withstand a heavy pull is connected to eyelet 18 by means of another conventional snap or connector 39. The position of line guide 10 and the curve of shank 16 are such that lead weight 36 causes the lure retriever to slide down fish line 32 in the manner shown in FIG. 4. The weight 36 holds the hook ends of the lure saver elevated until the device reaches the snagged lure. Upon reaching the end of the fish line 32 it may be seen that a pull on cord 34 will tilt the device about the fulcrum established at line guide 10. This permits hooks 25 and 26 to swing down over the lure 30, its hooks, or the snag itself. A continued pull on heavy weight cord 34 serves to dislodge lure 30 or snag 31. The shape of my invention is such that the pulling force of cord 34 causes the hooks to interlock even more tightly and hooks 25 and 26 are caused to engage the snag in the same direction as the lure thus ensuring quick attachment. It should be noted that saddle 24 is designed to be long enough to reach lure 30 even if line guide 10 is stopped by a leader connection or the like. In the preferred embodiment the overall length of the lure retriever is approximately 10 inches with its widest portion being in the neighborhood of one and a half inches. These dimensions are not critical, however, and many variations are possible. The use of one-eighth inch diameter wire is also not critical to the invention but has been found to provide in the preferred embodiment a particularly rugged yet lightweight device. It is evident that the form of construction is inexpensive involving only simple welds and a small amount of wire. The remaining apparatus including the heavy weight cord 34, the connectors 38 and 39, and the weight 36 are all conventional apparatus which a fisherman would likely already have in his tackle box. Once the weight 36 and the cord 34 are connected it may be seen that the lure retriever can be used again and again with a minimum of effort. Insertion on the line 32 is made quickly and easily by simply spreading the two hooks of the saddle 24 and inserting the device over the fishing line. Even if the lure saver cannot dislodge the lure, its design and configuration are such that it may be able to actually move or dislodge the object in which the lure is snagged. By retrieving this object the fisherman could himself disengage the lure.

In operation it has been found that weight 36 always holds the lure saver in the position shown. If the fishing line is then kept reasonably tight a pull on heavy weight line 34 makes the device pivot about line guide 10 into direct engagement with the lure 30. Experiments have shown that the lure saver of my invention will rescue all heavy bodied plugs and slim bodied plugs. It is also been found that the lure retriever is suitable for dislodging spoons, wigglers and wobblers and some success has been had in rescuing jigs, spinners, and live bait rigs. Since the specific shape of the saddle and the hooks could vary over a wide range without departing from the spirit and scope of the invention and various other design modifications could be made no limitation is intended by the specific structure shown in the drawing except as defined by the following claims.

I claim:

1. A fishing lure retrieving device for sliding down a fishing line comprising in combination:
   a shank connected at a first end to a hook means, the second end of said shank having connecting means to affix thereto suitable weighting means to urge said shank to hang below the fish line and an auxiliary retrieving cord; and
   line guide means affixed to the device proximate the connection between the first end of the shank and the hook means adapted to be attached to the fishing line and slid theredown.

2. The device of claim 1 in which said hook means comprises a pair of interlocking hooks extending out from the first end of said shank which hooks are releasably spring loaded in the interlocked position.

3. The device of claim 2 in which said line guide comprises a spiral of wire welded to the shank.

4. The device of claim 3 in which said interlocking hooks, shank, and connecting means are formed from a single piece of wire.

* * * * *